US006780923B2

(12) United States Patent
Guha et al.

(10) Patent No.: US 6,780,923 B2
(45) Date of Patent: Aug. 24, 2004

(54) REINFORCED POLYESTER RESINS HAVING INCREASED TOUGHNESS AND CRACK RESISTANCE

(75) Inventors: Probir K. Guha, Troy, MI (US); Michael J. Siwajek, Warren, MI (US); Robert C. Yen, Farmington Hills, MI (US)

(73) Assignee: ThyssenKrupp Budd Company, Troy, MI (US)

( * ) Notice: Subject to any disclaimer, the term of this patent is extended or adjusted under 35 U.S.C. 154(b) by 343 days.

(21) Appl. No.: 10/036,707

(22) Filed: Nov. 8, 2001

(65) Prior Publication Data

US 2003/0100651 A1 May 29, 2003

(51) Int. Cl.[7] .............................. C08J 3/00; C08K 3/26; C08K 3/40; C08L 51/00; C08L 67/00
(52) U.S. Cl. ...................... 524/539; 523/500; 523/513; 523/527; 524/401; 524/425; 524/443; 524/444; 524/451; 524/460; 524/492; 524/493; 524/494; 525/165; 525/168
(58) Field of Search ................................ 524/401, 425, 524/443, 444, 451, 460, 492, 493, 494, 539; 523/500, 513, 527; 525/165, 168

(56) References Cited

U.S. PATENT DOCUMENTS

| | | | |
|---|---|---|---|
| 3,955,566 A | | 5/1976 | Stoffey |
| 3,957,906 A | * | 5/1976 | Buzbee et al. ................. 525/40 |
| 4,352,906 A | | 10/1982 | Reed et al. |
| 4,439,576 A | | 3/1984 | OConnor et al. |
| 4,535,110 A | | 8/1985 | Iseler et al. |
| 4,663,429 A | * | 5/1987 | Murai et al. ................. 528/355 |
| 5,143,996 A | | 9/1992 | Chung et al. |
| 5,354,809 A | | 10/1994 | Hesse et al. |
| 5,854,317 A | | 12/1998 | Rinz |

FOREIGN PATENT DOCUMENTS

| | | |
|---|---|---|
| CA | 2258847 | 1/1998 |
| JP | 52025893 | 2/1977 |
| JP | 64-062322 | 3/1989 |
| JP | 02150456 | 6/1990 |
| JP | 06009751 | 1/1994 |
| JP | 06220145 | 8/1994 |
| JP | 08231655 | 9/1996 |
| JP | 10036459 | 2/1998 |
| JP | 2000017092 | 1/2000 |

OTHER PUBLICATIONS

Avella, et al., Interaction between low–profile agents and glass fibers in polyester–based composites, J. Mater. Sci (1992), 27(15), 4131–8 (Abstract).
Francisco, et al., Performance of fundamental physical and chemical parameters of fiber glass reinforced plastics and coating in tropical environment, Proc. —Int. Congr. Met. Corros. (1984), vol. 2, 523–6 (Absract).
Encyclopedia of Polymer Science & Engineering, "Polyesters, Unsaturated", 2nd ed., vol. 12, pp. 256–269, 1988.
Encyclopedia of Polymer Science & Engineering, "Reinforced Plastics, Thermosets", 2nd ed., vol. 14, pp. 350–391, 1988.
Chanda, et al., "Plastics Technology Handbook", pp. 198–207, 1993.
Encyclopedia of Polymer Science & Engineering, "Plastics Processing", 2nd ed., vol. 11, pp. 280–281, 1988.

* cited by examiner

*Primary Examiner*—Patrick D. Niland
(74) *Attorney, Agent, or Firm*—Harness, Dickey & Pierce, P.L.C.

(57) ABSTRACT

A molding compound contains a reinforcing fiber, a non-fibrous filler, and an unsaturated polyester resin. The unsaturated polyester resin contains an unsaturated monomer as well as a polyester polymer. The polymer is a unsaturated polyester made from a hydroxyl component and a carboxylic component. The hydroxyl component contains both a monomeric diol or triol, and a polymeric polyol. The polymeric polyol is a hydroxyl-terminated polymer such as polyether or polyester diols or triols. The carboxylic component can be provided by an unsaturated carboxylic diacid, an unsaturated carboxylic anhydride, an unsaturated carboxylic diester or mixtures thereof. Molded articles are provided by compression or extrusion molding of a molding compound as described above. The articles are characterized by improved crack resistance, toughness, and surface appearance.

34 Claims, No Drawings

REINFORCED POLYESTER RESINS HAVING INCREASED TOUGHNESS AND CRACK RESISTANCE

FIELD OF THE INVENTION

The invention relates to reinforced thermoset plastics having improved physical characteristics. More specifically, the invention relates to fiber reinforced polyester resin molding compounds having increased toughness and surface smoothness.

BACKGROUND OF THE INVENTION

Reinforced thermoset plastics are made of plastic resins and reinforcing fibers. They are widely used in commerce as materials because of their advantageous combination of properties, including light weight, high strength to weight ratio, and ease and versatility of construction.

Polyester resins are common components of reinforced thermoset plastics. Such resins are based on a polyester polymer containing at least one unsaturated carboxylic component to introduce unsaturation into the backbone chain of the polymer. The resins further contain an unsaturated monomer. Such resins can undergo cure to form solid thermoset articles. Typically the heat required for cure is provided during compression molding of the article. Reinforcing fibers such as glass fibers and non-fibrous fillers can be added to the polyester resins to produce cured articles having a wide range of desirable physical properties.

Sheet molding compound is used in the manufacture of large reinforced compression moldings. Sheet molding compound is finding increased use in automotive applications that take advantage of its light weight, corrosion resistance, and design flexibility. In particular, sheet molding compounds find use as structural components for front end panels, tail gates, exterior and interior panels, hoods, roofs, deck lids, fenders, doors, and horizontal panels.

Sheet molding compound is a glass fiber reinforced thermoset polyester compound in sheet form. Because of its high strength, it is widely used in commerce as a construction material. Its strength, stiffness, and other properties make it suitable for use in horizontal as well as vertical panels, for example, in automobiles. Such panels on automobiles must display a high degree of surface smoothness so the painted surface is acceptable to the consumer.

Bulk molding compound is also based on polyester resin, but generally contains shorter reinforcing fibers and relatively more non-fibrous filler than sheet molding compound. Because of this, it has lower mechanical strength than sheet molding compound. Nevertheless, surfaces made of bulk molding compound are often exposed, and therefore, should be as uniform as possible for acceptance by the consumer.

Painted or topcoated products made from molded fiber reinforced thermoset polyester resins are subject to a number of defects. Such defects include microcracks in the article itself and paint pops on the surface of the article. Some of the defects are caused by improper use and installation of the article by the consumer, and others are inherent in the material itself.

A particular kind of defect is known as edge pop. Edge pops manifest themselves as craters or pops along the edge of the molded article. They are believed to result from the release of gaseous materials from the thermoset resin during cure. In practice, the problem is observed to be more severe at the edge of the article. It is believed this is due to the relative lack of reinforcing fibrous material at the edge of the article, or alternatively to the fact that the orientation of the fibers at the edge is not as uniform as elsewhere in the bulk of the article.

It would be desirable to increase the toughness of the resin in the thermoset article in order to reduce or eliminate the defect such as edge pops. At the same time, the strength of the article must be maintained.

Unsaturated poly resins made by polymerizing propylene glycol and maleic anhydride are widely used to produce reinforced compression moldings and sheet molding compounds. However, the articles suffer from the defects mentioned above.

Unsaturated polyester resins comprising copolymers of unsaturated carboxylic acids or anhydrides and a diol component including polypropylene oxide are known, but such resins have not been shown to be useful to produce rigid structural panels such as those produced from sheet molding compound or bulk molding compound. For example, in Japanese Patent 02150456 to Dainippon Ink and Chemicals, a sheet with good low temperature flexibility is produced that contains in addition to glass fiber reinforcement, a polyester polyether copolymer of ethylene glycol, propylene glycol, polypropylene oxide, phthalic acid, and maleic anhydride. The polypropylene oxide makes up 60% of the total amount of ethylene glycol, propylene glycol, and polypropylene oxide. It was not shown to be useful to make rigid panels.

In Japanese Patent 01062322 to Hitachi Chemical Co., a composition is used without glass fiber reinforcement to make a pipe lining. The composition is based on an unsaturated polyester that is a copolymer of alpha, beta unsaturated dibasic acids, unsaturated fatty acid oligomer, and polyalkylene glycol or alkoxylates of bisphenol A of number average molecular weight 700–2000. This polyester resin contains no monomeric diol, and produces a flexible material suitable as a lining.

SUMMARY OF THE INVENTION

The present invention provides a molding compound containing a reinforcing fiber, a non-fibrous filler, and an unsaturated polyester resin. The unsaturated polyester resin contains an unsaturated monomer as well as a polyester polymer. The polymer is a unsaturated polyester made from a hydroxyl component and a carboxylic component. The hydroxyl component contains both a monomeric diol or triol, and a polymeric polyol. The polymeric polyol is a hydroxyl-terminated polymer such as polyether or polyester diols or triols. The carboxylic component can be provided by an unsaturated carboxylic diacid, an unsaturated carboxylic anhydride, an unsaturated carboxylic diester or mixtures thereof.

In a preferred embodiment, the molding compound also contains a second fiber, with fibers shorter than those of the reinforcing fiber.

In another embodiment, molded articles are provided by compression or extrusion molding of a molding compound as described above. The articles are characterized by improved crack resistance, toughness, and surface appearance.

DETAILED DESCRIPTION OF THE INVENTION

The invention provides molding compound containing
a reinforcing fiber;
a non-fibrous filler; and
an unsaturated polyester resin.
The unsaturated polyester resin contains an unsaturated monomer as well as a polyester polymer. The polymer is a unsaturated polyester made from a hydroxyl component and a carboxylic component. The hydroxyl component contains both a monomeric diol or triol, and a polymeric polyol. The polymeric polyol comprises a hydroxyl-terminated polymer such as a polyether or polyester diol or triol. The carboxylic component can be provided by an unsaturated carboxylic diacid, an unsaturated carboxylic anhydride, an unsaturated carboxylic diester or mixtures thereof.

In a preferred embodiment, in addition to the reinforcing fiber, the molding compound contains a second fiber having fibers shorter than those of the reinforcing fibrous filler.

Sheets and other articles can be produced from the molding compound by known processes including but not limited to compression molding, extrusion molding, pultrusion, hand lay-up, and liquid composite molding.

The reinforcing fiber may be used as a continuous filament to produce the molded articles of the invention. Alternatively, the reinforcing fiber may be provided so that the average length is about 6 mm or greater. There may be individual fibers of a length shorter than 6 mm, but the average length will be greater. A wide variety of fibrous material is useful as the reinforcing fiber. Examples include, without limitation, glass fibers, carbon fibers, graphite fibers, aramid fibers, SMC regrind, boron fibers, cellulose, nylon fibers, other textile fibers, and combinations thereof. In a preferred embodiment, glass fibers are used as the reinforcing filler.

Continuous glass filaments can be manufactured by a melt spinning process. After extrusion and sizing, the glass filaments can be wound onto spools as fiberglass rovings. Such spools can be mounted on plastics manufacturing equipment so as to provide the rovings for direct application as continuous filaments or through tubes for choppers which produce glass fibers of the required length for the application.

The length of the glass fibers is selected according to the desired characteristics of the molded article. For example, in sheet molding compositions of the invention, it is preferable to use glass fibers of one inch or longer, while for bulk molding compounds of the invention, it is typical to use a shorter glass fiber such as one quarter inch (about 6 mm). The glass fibers may be placed in the molded articles in a random orientation, or they may be oriented. By orienting the glass fibers in one direction or another, the fabricator can produce articles having enhanced properties in certain directions.

The reinforcing fibrous materials are present in the molding compound at a level sufficient to give the molding compound and the article made from it a desired stiffness. In general, the reinforcing fiber will make up 10–65% by weight of the total composition.

A non-fibrous filler is also used in the molding compound of the invention. Such fillers are used to add desirable properties to the compound, including higher strength and lower cost. Examples of non-fibrous fillers include, without limitation, calcium carbonate, alumina, clay, mica, woolastonite, silicate, and wood flour. Mixtures of fillers may also be used. In a preferred embodiment, calcium carbonate is used as the non-fibrous filler.

Depending on the application, the non-fibrous filler is used in different amounts. In general, the amount of non-fibrous filler can range up to 70% of the total weight of the composition.

The unsaturated polyester resin of the invention contains an unsaturated monomer and a polyester polymer. The unsaturated monomer can be any conventional unsaturated monomer used to crosslink unsaturated polyester resins. These include, without limitation, styrene, vinyl toluene, methylmethacrylate, diallyl phthalate, alpha-methyl styrene, triallyl cyanurate, and divinyl benzene. Mixtures of unsaturated monomers may also be used in the invention. In a preferred embodiment, styrene is used as the unsaturated monomer.

The polyester polymer of the unsaturated polyester resin is in general a reaction product of a monomer or a group of monomers having hydroxyl groups (a hydroxyl component) and another monomer or group of monomers having carboxylic groups (a carboxylic component). The monomers having carboxylic groups are in general, taken from the class of carboxylic diacids, carboxylic anhydrides, and carboxylic diesters. Mixtures of carboxylic monomers may be also be used. The carboxylic component of the polyester polymer of the invention may include a saturated diacid anhydride or diester. However, at least one of the carboxylic components of the polyester polymer will have an olefinic unsaturation. Examples of unsaturated acids or anhydrides useful to make the polyester polymers of the invention include, without limitation, maleic anhydride, fumaric acid, methacrylic acid, acrylic acid, itaconic acid, and a cyclopentadiene-maleic anhydride Diels-Alder adduct. In a preferred embodiment, the unsaturated acid or anhydride comprises maleic anhydride.

As mentioned above, carboxylic components not containing unsaturation may also be used along with the unsaturated components to make the polyester polymers of the invention. Such saturated acids include, without limitation, phthalic acid, isophthalic acid, adipic acid, isophthalic acid, adipic acid, chlorendic anhydride, tetrabromophthalic anhydride, tetrahydrophthalic anhydride, terephthalic acid, tetrachlorophthalic anhydride, and glutaric acid.

The hydroxyl component of the polyester polymer of the invention includes both a monomeric diol or triol and a polymeric polyol. Useful monomeric diols of the invention are well known in the art and include, without limitation, propylene glycol, ethylene glycol, diethylene glycol, neopentyl glycol, dipropylene glycol, dibromoneopentyl glycol, bisphenol dipropoxy ether, 2,2,4-trimethylpentane-1,3-diol, tetrabromobisphenol dipropoxy ether, 1,4-butanediol, 1,2-butanediol, and dicylopentadiene hydroxyl adducts. The hydroxyl component also contains a polymeric polyol which is selected from the group consisting of polyether diols, polyether triols, polyester diols, and polyester triols. Suitable polyether diols or triols include those that can be produced by homopolymerization or copolymerization of a lower chain alkylene oxide or oxides. Examples of such alkylene oxides include, without limitation, ethylene oxide, propylene oxide, 1,2-butylene oxide, 2,3-butylene oxide, and tetrahydrofuran. In one embodiment, the polyether diol or triol is a homopolymer of one of the above alkylene oxides. Examples of diols include polyethylene oxide, polypropylene oxide, polybutylene oxide, and polytetramethylene glycol, as well as the reaction product of the corresponding alkylene oxide onto difunctional starter molecules such as, without limitation, ethylene glycol, propylene glycol, diethylene glycol, propylene glycol, and the like. Examples of polyether triols include, without limitation, the reaction product of the corresponding alkylene oxide onto trifunctional starter molecules such as glycerol and trimethylolpropane. A wide range of molecular weights of such homopolymers may be used in the invention. Preferably, the number average molecular weight of homopolyers will range from about 200 up to about 4000. In a preferred embodiment, the molecular weight is between about 400 and about 2000.

Copolymers of alkylene oxides may also be used as the polyether diol or triol component of the polyester polymer of the invention. Such include block as well as heteric copolymers, and are generally prepared by reacting the corresponding alkylene oxide or mixture of alkylene oxides onto di- or tri-functional starter molecules as described above. Examples include, without limitation, ethylene oxide/propylene oxide copolymers, ethylene oxide/propylene oxide block copolymers, ethylene oxide/butylene oxide copolymers, ethylene oxide/butylene oxide block copolymers, propylene oxide/butylene oxide copolymers, and propylene oxide/butylene oxide block copolymers. In general, suitable copolymers have a wide range of molecular weights. In a preferred embodiment, the number average molecular weight of the copolymers ranges from about 200 up to about 4000. In a more preferred embodiment, the molecular weight ranges from about 400 up to about 2000.

In another embodiment, the hydroxyl component contains a polyester polyol. In one embodiment, the polyester polyols useful in the invention are made up of copolymers of monomeric diols and saturated carboxylic components. The monomeric diols useful for preparing the polyester polyols of the invention are in general the same as those noted above useful for preparing the polyester polymer component of the unsaturated polyester resin. As such, the diols are well known in the art and include, without limitation, propylene glycol, ethylene glycol, diethylene glycol, neopentyl glycol, dipropylene glycol, dibromoneopentyl glycol, bisphenol dipropoxy ether, 2,2,4-trimethylpentane-1,3-diol, tetrabromobisphenol dipropoxy ether, 1,4-butanediol, 1,2-butanediol, and dicylopentadiene hydroxyl adducts. Mixtures of monomeric diols may also be used. In a preferred embodiment, the monomeric diol is selected from the group consisting of propylene glycol, ethylene glycol, 1,2-butanediol, 1,4-butanediol, and mixtures thereof.

The saturated acids useful for preparing the polyester polyol (diol or triol) of the invention can be selected from among the same saturated acids as are useful for preparing the polyester polymer of the unsaturated polyester resin of the invention. Useful carboxylic components also include anhydrides and esters of such saturated acids. As noted above, such saturated acids and their anhydrides and esters include, without limitation, those based on phthalic acid, isophthalic acid, adipic acid, isophthalic acid, chlorendic anhydride, tetrabromophthalic anhydride, tetrahydrophthalic anhydride, terephthalic acid, tetrachlorophthalic anhydride, and glutaric acid. Mixtures of saturated acids, esters, or anhydrides may also be used.

In another embodiment, the polyester polyol useful in the invention can be prepared by polymerization of a molecule containing both hydroxyl functionality and carboxyl functionality. In one embodiment, such polyester polyols are prepared by homopolymerization of lactones. Examples of lactones useful in the invention include, without limitation, caprolactone, valerolactone, and butyrolactone, as well as $\gamma$- and $\epsilon$-isomers of the above where appropriate. In one preferred embodiment, the polyester polyol is a copolymer of caprolactone.

In a preferred embodiment, the polyester polyols useful in the invention have a number average molecular weight from about 200 up to about 4000, preferably from about 200 up to about 2000.

The polyester polymers used to make the unsaturated polyester resin of the invention are produced from a monomer mixture containing monomers of the hydroxyl component and monomers of the carboxylic component. Examples of hydroxyl component monomers and carboxylic component monomers are given above. As noted, the hydroxyl component contains a monomeric and polymeric polyol. In general, the polymeric polyol of the invention will be present at a level of at least 1% and preferably at least 5% by weight of the total monomer mixture of the hydroxyl component and the carboxylic component. The monomer mixture will in general contain up to 30% by weight of the polymeric polyol, based on the total weight of the monomer mixture of the hydroxyl component and the carboxylic component. More preferably, the monomer mixture will contain up to about 20% by weight of the polymeric polyol. In a preferred embodiment, it is present at about 10% by weight. That is, the polyester polymers of the invention are prepared from a mixture of monomers that contains about 30% by weight or less of the polymeric polyol, preferably about 20% or less. In another embodiment, the mixture of monomers contains less than about 10% by weight of the polymeric polyol. With due correction for the weight of water lost on polycondensation, the polymeric polyol will generally make up a corresponding proportion of the polyester polymer.

The polyester polymers of the invention are manufactured by conventional means, for example, by reacting the starting monomers in a heated steel reactor vessel with moderate stirring. The polymeric polyol (polyether or polyester diol or triol) can be incorporated into the polyester polymers of the invention in a number ways known to one of skill in the art. In one process, all the monomers are added to the reactor vessel in a single charge at the beginning, and reaction proceeds. Such a process is useful for providing a batch polyester. Alternatively, it may be desirable to feed the monomers into the reaction vessel during the reaction. For example, the monomers may be fed at a constant ratio to one another in order to provide a continuous process for polyester manufacture. The monomers may also be added in stages so as to produce polyester polymers with desired block-type structures, which can lead to desirable properties. In the context of polyester polymers of the invention, such blocks may include blocks that are relatively more or less concentrated in unsaturated carboxylic monomer. Alternatively, the hydroxyl-containing monomers may be added in stages to provide a polymer having segments or blocks relatively more or less concentrated in the monomeric diol or the polymeric polyol. For example, it may be desirable to add the monomeric diol in a first stage to produce a carboxy-functional intermediate. Thereafter, the polymeric polyol may be added to produce a block rich in the polymeric polyol monomer. As yet another alternative, a carboxyl-terminated polyester may be made by polymerizing all but a portion of the polymeric polyol in a first stage. In a subsequent stage, the remaining portion of polymeric polyol may be added to the reaction mixture to incorporate the polymeric polyol as a bridging segment between the portions of polyester polymer produced in the first stage.

The order of addition of monomers may be varied as described above. Regardless of the batch, continuous, or multi-stage process used, reaction is typically carried out at a temperature of from 120°–200° C. preferably from 140° C. up to about 190° C. Preferably, water of reaction is removed during the reaction process. If desired, an acid catalyst may be used. Example of acid catalysts include Lewis acid such as zinc chloride and lithium chloride.

The reaction may be carried out in a solvent. However, it is preferred to add the monomers to the reaction vessel directly and to carry out the reaction without solvent. The molar equivalent ratios of hydroxyl component to carboxylic component may be varied as is known in the art to achieve a desired molecular weight distribution. If hydroxyl terminal polyesters are desired, an excess of diol component to carboxylic component is used. On the other hand, to produce carboxy terminal polyesters, an excess of carboxylic component is used. The molecular weight of the polyester polymer formed in the reaction may be monitored indirectly by observing hydroxyl number, acid number, and viscosity.

The polyester polymers of the invention are long chain molecules with an unsaturated double bond in the backbone that serves as a reaction point that can be crosslinked with other molecules to turn the liquid resin into a hardened or thermoset structure. The resin of the invention contains in addition to the polyester polymer, an unsaturated monomer that participates in the crosslinking reaction. As noted above, a preferred unsaturated monomer for use in the polyester resin of the invention is styrene. The resin can in general be dissolved in the monomer which is most frequently styrene. Other monomers may be added. For example, methylmethacrylate may be added to increase sun and weather resistance. The monomer acts as solvent and provides crosslinking sites for the unsaturated points on the backbone of the polymer.

Hardening or curing of the resin can be carried out in the presence of initiators. Suitable initiators are well known in the art and include, without limitation, benzyl peroxide, methyl ethyl ketone peroxides, cumene hydroperoxide, lauroyl peroxide, t-butyl peroctoate, benzoyl peroctoate, t-butyl perbenzoate, di-t-butyl peroxide, and dicumyl peroxide. Mixtures of initiators may also be used. Suitable initiators are chosen depending on the reactivity desired. For example, benzoyl peroxide may be used to initiate crosslinking at a temperature from 0–25° C., while dicumyl peroxide is active over a temperature range of about 130–175° C. The initiators are believed to act as free radical catalysts that initiate a controlled crosslinking reaction involving the unsaturation of the polyester backbone and the unsaturation of the unsaturated monomer such as styrene. Crosslinking may be carried out at room temperature or at elevated temperatures. Alternatively or additionally, the crosslinking may be carried out under radiation, such as ultraviolet radiation. During storage of the uncured polyester resins of the invention, inhibitors such as hydroquinone may be added to inhibit premature crosslinking or polymerization. Crosslinking accelerators may also be used in the polyester resins of the invention. A non-limiting example of a crosslinking accelerator includes cobalt naphthenate.

Non-fibrous fillers, as described above, may be added to the polyester resins to make the molding compounds of the invention. Such fillers may be used to reduce the shrinkage and lower the cost of the molding compounds. They may also be used to make the molding compounds opaque and to act as thixotropic agent.

As mentioned above, the molding compositions of the invention optionally contain a second fiber. When used, the second fiber is present in the molding compositions of the invention at a level up to 7%, preferably up to 4% of the total weight of the composition. The second fiber may be of the same material as the reinforcing fiber, or may be different. However, the second fiber has fibers that are shorter than those of the reinforcing filler, as discussed below.

A wide variety of fibers can be used as the second fiber. Examples include, without limitation, glass fibers, carbon fibers, cellulose fibers, aramid fibers, textile fibers, and nylon fibers. The material known as SMC regrind can also be used as the second fiber. SMC, or sheet molding compound consists of reinforcing fibers, usually glass fibers, in a thermoset molded resin composition. The SMC can be recycled by grinding into small particles. The ground particles contain reinforcing fibers as described above. Such reground particles are useful as the second fiber of the invention.

The second fiber has fibers which are in general shorter than the fibers of the reinforcing fiber. Whereas the reinforcing fibers have a length of six millimeters or greater as described above, the fibers of the second fiber have lengths of four millimeters or less. In a preferred embodiment, the length of the second fiber is two millimeters or less. The length of the fibers of the second fiber is in general shorter than that required to provide reinforcement to the molded article. The second fiber is added instead to add strength or durability to the molded parts especially at edges where the longer reinforcing fibers can not be effectively placed. Thus the use of the second fiber leads to molded parts having improved properties and appearance.

Thermoplastic polymeric materials which reduce shrinkage during molding can also be included in the compositions of the invention. These thermoplastic materials can be used to produce molded articles having surfaces of improved smoothness. Examples of useful thermoplastic polymers include homopolymers of ethylene, styrene, vinyl toluene, vinyl acetate, alkyl methacrylates and alkyl acrylates. Additional examples of thermoplastic polymers are copolyers of: vinyl chloride and vinyl acetate; vinyl acetate and acrylic or methacrylic acid; styrene and acrylonitrile; methyl methacrylate and alkyl esters of acrylic acid; methyl methacrylate and styrene; and methyl methacrylate and acrylamide. An additional example is polyurethane. Examples of commercially available polymers that can be used include: Neulon Polyester Modifier T-Plus, a product of Union Carbide identified as polyvinyl acetate-ester epoxide polymer dissolved in styrene monomer; LP-40A, a product of Union Carbide identified as a polyvinyl acetate copolymer dissolved in styrene monomer; LP-90, a product of Union Carbide identified as a polyvinyl acetate dissolved in styrene monomer; Kraton G1701, a product of Shell identified as a styrene-ethylene/propylene diblock and/or block copolymer; Finaprene 401, a product of Fina Oil and Chemical Company identified as a styrene/budadiene/styrene block copolymer; RP-700, a product of Owens Corning identified as a polymethyl methacrylate; MD-9520, a product of Chevron identified as polystyrene; and Uralloy LP-2035, a product of Ashland Chemical identified as a sytrene solution of polyurethane.

A preferred additive to the molding compositions of the invention consists of a dual-functional additive prepared by the one-step addition reaction between one equivalent weight of a diol or triol of molecular weight from 600 to 4,000 and two equivalent weights of a polyisocyanate in the presence of a conventional urethane catalyst. Suitable dual functional additives are described in U.S. Pat. No. 4,535,110, the disclosure of which is hereby incorporated by reference.

Other conventional additives may be added to the molding compounds of the invention. These include, without limitation, pigments, uv absorbers, and flame retardants.

Bulk molding compound and sheet molding compound are prepared from the resins of the invention by known methods. For example, to make bulk molding compound it is possible to put all the ingredients including the reinforcing fibers into a mixing vessel. Thereafter, the ingredients are kneaded together until uniform. The bulk molding compound thus produced has a putty or paste-like consistency.

Sheet molding compounds may be also produced from the resins of the invention by known methods. In a typical non-limiting example, an A-side is first made by combining the polyester resin of the invention, filler, catalyst, inhibitors, and low profile additives. If the optional second fiber is used, it can be added to the A-side. In a B-side, thickener, reinforcing fibers, and optionally pigment may be combined together. The dual functional described above may be used as the thickener. The manufacturing procedure starts by mixing the A-side ingredients until a temperature of 90° F. is reached. Thereafter, the B-side is added and the mixture stirred until the temperature reaches 100° F. Next, the mixture is poured into two dokter boxes. A film of, for example, polyethylene is pulled under the dokter box and the mixture is deposited on the film by gravity. The film pulls the mixture past a dam or blade which is set at a height determined by a desired weight. The blade levels the mixture on the film, and the film pulls the paste past and under a chopper which deposits glass fibers onto the paste. There is produced according to this process, a film with a uniform paste thickness that contains glass fibers embedded in the paste.

In the process, a second dokter box is also used which produces a film containing a layer of resin and optionally glass fibers. The two films are brought together, paste side to paste side, and go through a series of rollers and compaction steps to squeeze out air and to wet out the glass fibers. Finally, the rolled and compacted sandwich structure is rolled or festooned to make an end product. The end product is matured at room temperature or optionally a slightly elevated temperature until it attains a certain desired viscosity. During the maturation step, the paste thickens and reaches a level of tackiness desirable for better handleability.

In addition to bulk molding and sheet molding processes, the unsaturated resins of the inveniton may be used in a variety of processes to produce molded articles.

In a hand lay-up or contact molding process, a mold is first treated with a release agent. Fiberglass cloth or mat is impregnated with an unsaturated polyester resin of the invention and placed over the mold. Air bubbles are removed and the mat or cloth is worked into contact with the mold surface by hand or mechanically by means of squeegees or rollers. Additional layers of glass cloth or mat may be added to build up to a desired thickness. Thereafter, the mold is subjected to curing. In the hand lay-up process, the reinforcement is provided by the fiberglass cloth or mat.

In the spray-up process, a release agent is first applied to a mold surface and then measured amounts of an unsaturated polyester resin of the invention containing reinforcing material is sprayed with a spray gun. The spray is directed onto the mold to build a uniform layer of a desired thickness.

In the continuous pultrusion process, continuous strands of reinforcing material are impregnated with a liquid resin comprising an unsaturated polyester resin of the invention. The strands are pulled through a long heated steel die which shapes the product and controls the resin content.

In the filament winding method, continuous stands of glass fiber are used. In a typical process, rovings or single strands are fed through a bath of resin and wound onto a suitably designed rotating mandrel. Arranging for the resin-impregnated fibers to traverse the mandrel at a controlled and predetermined manner makes it possible to lay down the fibers in any desired fashion to give maximum strengths in the direction required. When the desired number of layers has been applied, a curing step is performed.

In the prepreg molding process, unidirectionally oriented layers of fibers are preimpregnated with a resin such as the unsaturated polyester resin of the invention and cured to an intermediate stage of polymerization (B-stage). When desired, the preimpregnated composite precursor, called a prepreg, can be laid up in the required directions in a mold for quick conversion into end products by the use of hot curing techniques.

These and other reinforcing processes are well known in the art and are described for example, in *Plastics Technology Handbooks*, second edition, Chanda and Roy eds., pg. 198 and following, the disclosure of which is hereby incorporated by reference.

EXAMPLES

To test the polyester resins of the invention, BMC formulas were prepared by mixing an A-side paste, a filler, a B-side solution, an isocyanate-terminated urethane prepolymer, and ¼" chopped glass fiber according to the following recipe:

|  | Component | Parts by Weight |
|---|---|---|
| A-side paste: |  | 99.3 |
|  | polyester resin | 50.1 |
|  | unsaturated monomer | 1.5 |
|  | stearic acid | 1.5 |
|  | catalyst | 2.6 |
|  | inhibitor solution | 2.6 |
|  | low profile additives | 40.3 |
|  | mold release agent | 0.7 |
| Filler: |  |  |
|  | calcium carbonate | 250 |
| B-side solution: |  |  |
|  | magnesium oxide dispersion (thickener) | 3.0 |
| Urethane prepolymer: |  | 8.0 |
| 1/4" chopped glass fiber: |  | 40 |

The urethane prepolymer in the Table represents the dual functional additive of U.S. Pat. No. 4,535,110 described above. Polyester resin in the Table represents the control polyester resin or the polyester of the invention as indicated in the Examples.

To determine the toughness of the resin of the invention, the resins are formulated into bulk molding compound as shown in the Table above. The ingredients are mixed together with a kneader. Thereafter, rigid panels are produced by compression molding the mixture at a temperature of 300° F. for 2.5 minutes at a pressure of 1000 PSI to form a test piece. The test piece is then used to run the tensile test according to ASTM method D638-98. Six samples are run and a stress load at yield versus strain (elongation at yield) curve is plotted. The area under the curve of the stress versus strain corresponds to the "toughness" of the resin. In the Examples, the toughness is reported as a percent gain in toughness over a control that is prepared with a conventional polyester resin.

In the tables the following abbreviations are used:

P1010 is a polypropylene oxide of number average molecular weight 1000, available commercially for example from BASF Corporation under the tradename Pluracol® P1010.

P410 is a polypropylene oxide of number average molecular weight 400, available commercially from BASF Corporation as Pluracol® P410.

PEG 700 is a polyethylene oxide of number average molecular weight of about 700.

P710 is a polypropylene oxide of number average molecular weight about 700, available commercially from BASF Corporation as Pluracol® P710.

PTMG 650 is a polytetramethylene glycol or polytetrahydrafuran of number average molecular weight approximately 650.

CAPA 200 is a polycapralactone of number average molecular weight approximately 200.

Comparative Example 1 and Examples 1–7 give the results of toughness determinations run on molded parts formulated with a variety of polyester resins.

TABLE

| | Comparative Example 1 | Example 1 | Example 2 | Example 3 | Example 4 | Example 5 | Example 6 | Example 7 |
|---|---|---|---|---|---|---|---|---|
| Polyester Resin | PG Maleate | 10% P1010 | 10% P 410 | 10% PEG 700 | 10% P710 | 20% P710 | 10% PTMG 650 | 10% CAPA 200 |
| Acid Number | 14.7 | 15.4 | 15.1 | 14.3 | 17.4 | 15.1 | 17.5 | 16.5 |
| Molecular Weight of Polyol | | 1000 | 400 | 700 | 700 | 700 | 650 | 500 |
| Tensile Strength | 3367 | 3272 | 3991 | 3546 | 4700 | 3909 | 3473 | 4114 |
| Toughness | 5.13 | 5.83 | 8.53 | 5.68 | 13.5 | 10.4 | 6.74 | 8.90 |
| % increase in toughness | — | 14 | 66 | 11 | 163 | 103 | 31 | 73 |

In Comparative Example 1, the control polyester resin was a conventional propylene glycol maleate polyester. The acid number was 14.7. The toughness determined in the tensile test was 5.13. The percent increase in toughness is indicated as 0 because it will serve as the control.

In Example 1, the resin was similar to the PG maleate resin of Comparative Example 1 except that 10% by weight of the monomers used to produce the polyester polyol were made up of a polymer of propylene oxide of molecular weight 1000. The level of the other monomers in the polyester were adjusted so as to produce a polyester polymer of acid number 15.4. The toughness measured in the tensile test was 5.83, representing a 14% increase in toughness over the Comparative Example.

In similar fashion, Example 2 shows that a 66% increase in toughness is obtained when the polyester resin is made with 10% by weight of polypropylene oxide of molecular weight 400. In Example 3, the resin was made with 10% of polyethylene glycol of molecular weight 700; in Example 4, the resin was made with 10% by weight of polypropylene oxide of molecular weight 700. In Example 5, the resin was made with 20% of polypropylene oxide of molecular weight 700. In Example 6, 10% of a polytetramethylene glycol of molecular weight 650 was used. Finally, Example 7 shows the result when the resin is made with 10% of a polyester polyol of molecular weight 500, the polyester polyol being a homopolymer of caprolactone.

In another set of experiments, the compositions of the invention were tested in a paint pop flex test. The test involves subjecting an SMC panel to a stress, then painting it and observing the number of defects, if any, on the surface after drying.

In the following Examples, a 2 by 18 inch specimen of molded SMC was prepared according to regular production practices. The edges are beveled with a file, and the surface is blown free of dust with a compressed air jet. The specimens are then pre-stressed by bending them around a bucket of 8¼" diameter and holding them in the bent position for 5 seconds. Next, the specimens are returned to the unstressed state and are coated with a conventional primer coating. The painted specimens are baked at 300° F. for 30 minutes. After baking, the number of defects is determined by a visual count.

| Example | Percent glass | Number of defects | Percent improvement | Percent P-710 in unsaturated polyester |
|---|---|---|---|---|
| Comparative Example 2 | 27.5 | 502 | (control) | 0 |
| Comparative Example 3 | 27.5 | 232 | 53.8 | 0 |
| Example 8 | 27.5 | 13 | 97.4 | 10 |

In Comparative Examples 2 and 3, commercial SMC compositions containing no polymeric polyol in the unsaturated resin were used. They contained 27.5% reinforcing glass fibers. Example 8, on the other hand, was made with an unsaturated polyester resin of the invention wherein 10% by weight of the monomers used consisted of polypropylene oxide of number average weight 700. Example 8 showed more than 90% decrease in the number of paint defects.

We claim:

1. A molding compound comprising
   a reinforcing fiber having average fiber length of 6 mm or greater;
   a non-fibrous filler; and
   an unsaturated polyester resin comprising an unsaturated monomer and a polymer, the polymer comprising a hydroxyl component and a carboxylic component,
   wherein the hydroxyl component comprises a monomeric diol or triol and a polymeric polyol, wherein the polymeric polyol has a number average molecular weight of 200 to 4000, and is selected from the group consisting of polyether diols, polyether triols, polyester polyols and combinations thereof, and the carboxylic component comprises at least one compound selected from the group consisting of unsaturated carboxylic diacids, unsaturated carboxylic anhydrides, unsaturated carboxylic diesters, and mixtures thereof,
   wherein the polymeric polyol is present at a level of 1 to 30 weight percent, based on the total weight of the hydroxyl component and the carboxylic component.

2. A molding compound according to claim 1, wherein the polymeric polyol comprises polyether diol or poly triol with number average molecular weight of 200 to 2000.

3. A molding compound according to claim 1, wherein the polymeric polyol comprises a polyester polyol.

4. A molding compound according to claim 1, wherein the polymeric polyol comprises polypropylene oxide.

5. A molding composition according to claim 1, wherein the polymeric polyol comprises polyethylene oxide.

6. A molding composition according to claim 1, wherein the polymeric polyol comprises polytetramethylene glycol.

7. A molding compound according to claim 1, wherein the polymeric polyol comprises polycaprolactone.

8. A molding compound according to claim 1, wherein the polymeric polyol is present at a level of 1 to 20 weight percent, based on the total weight of the hydroxyl component and the carboxylic component.

9. A molding compound according to claim 1, wherein the monomeric diol comprises one or more compounds selected from the group consisting of propylene glycol, ethylene glycol, 1,2-butane diol, 1,4-butane diol, and combinations thereof.

10. A molding compound according to claim 1, wherein the reinforcing fiber comprises glass fibers.

11. A molding compound according to claim 1, wherein the non-fibrous filler is selected from the group consisting of calcium carbonate, alumnina, clay, mica, wollastonite, silicate, wood flour, and mixtures thereof.

12. A molding compound according to claim 11, wherein the non-fibrous filler comprises calcium carbonate.

13. A molding compound according to claim 1, further comprising up to 7% by weight based on the weight of the entire molding compound, of a second fiber having fibers of average length less than or equal to 4 millimeters.

14. A molding compound according to claim 13, wherein the second fiber is selected from the group consisting of glass fibers, carbon fibers, cellulose fibers, aramid fibers, textile fibers, SMC regring, and nylon fibers.

15. A molding compound according to claim 13, wherein the second fiber comprises carbon fibers.

16. A molding compound according to claim 13, wherein the second fiber comprises SMC regrind.

17. A molding compound according to claim 13, wherein the second fiber comprises glass fibers.

18. A molding compound according to claim 1, wherein the reinforcing fiber comprises glass fibers having an average length of greater than 10 millimeters.

19. A molded article prepared by compression molding a molding compound according to claim 1.

20. A process for producing a molded thermoset article comprising the steps of providing a molding compound comprising:
   a reinforcing fiber having average fiber length of 6 mm or greater;
   a non-fibrous filler; and
   an unsaturated polyester resin comprising an unsaturated monomer and a polymer, the polymer comprising a hydroxyl component and a carboxylic component, wherein the hydroxyl component comprises a monomeric diol or triol and a polymeric polyol, wherein the polymeric polyol has a number average molecular weight of 200 to 4000, and is selected from the group consisting of polyether diols, polyether triols, polyester polyols and combinations thereof, the carboxylic component comprises at least one compound selected from the group consisting of unsaturated carboxylic diacids, unsaturated carboxylic anhydrides, unsaturated carboxylic diesters, and mixtures thereof, and wherein the polymeric polyol is present at a level of 1 to 30 weight percent, based on the total weight of the hydroxyl component and the carboxylic component; and applying heat and pressure to the molding compound for a time sufficient to cure the article.

21. A process according to claim 20, wherein the polymeric polyol comprises polypropylene oxide.

22. A method according to claim 20, wherein the polymeric polyol comprises polyethylene oxide.

23. A method according to claim 20, wherein the polymeric polyol comprises polytetramethylene glycol.

24. A method according to claim 20, wherein the polymeric polyol comprises polycaprolactone.

25. A method according to claim 20, wherein the polymeric polyol is present at a level of 1 to 20 weight percent, based on the total weight of the hydroxyl component and the carboxylic component.

26. A method according to claim 20, wherein the molding compound further comprises up to 7% by weight based on the weight of the entire molding compound of a second fiber having fibers of average length less than or equal to 4 millimeters.

27. A method for making a reinforced thermoset article comprising the steps of
   placing a fiberglass mat over a mold;
   impregnating the mat with an unsaturated polyester resin, and
   applying heat and pressure to the mold for a time sufficient to effect cure,
wherein the unsaturated polyester resin comprises an unsaturated monomer and a polymer, the polymer comprising a hydroxyl component and an unsaturated carboxylic component, the hydroxyl component comprising a monomeric diol or triol and a polymeric polyol, wherein the polymeric polyol has a number average molecular weight of 200 to 4000, and is selected from the group consisting of polyether dials, polyether triols, polyester polyols and combinations thereof, the carboxylic component comprises at least one compound selected from the group consisting of unsaturated carboxylic diacids, unsaturated carboxylic anhydrides, unsaturated carboxylic diesters, and mixtures thereof, and wherein the polymeric polyol is present at a level of 1 to 30 weight percent, based on the total weight of the diol component and the carboxylic component.

28. A method according to claim 27, wherein the polymeric polyol is present at a level of 1 to 20 weight percent, based on the total weight of the diol component and the carboxylic component.

29. A method according to claim 27, wherein the polymeric polyol comprises a polyether diol or polyether triol, or a mixture thereof.

30. A method according to claim 27, wherein the polymeric polyol comprises a polyester polyol.

31. A pultrusion process comprising the steps of
   providing continuous strands of reinforcing fiber;
   impregnating the strands with an unsaturated polyester resin; and
   applying heat and pressure to the impregnated strand for a time sufficient to effect cure;
wherein the unsaturated polyester comprises an unsaturated monomer and a polymer, the polymer comprising a hydroxyl component and a carboxylic component, the hydroxyl component comprising a monomeric diol or triol and a polymeric polyol, wherein the polymeric polyol has a number average molecular weight of 200 to 4000, and is selected from the group consisting of polyether diols, polyether triols, polyester polyols and combinations thereof, and the carboxylic component comprises at least one compound selected from the group consisting of unsaturated carboxylic diacids, unsaturated carboxylic anhydrides, unsaturated carboxylic diesters, and mixtures thereof, wherein the polymeric polyol is present at a level of 1 to 30 weight percent, based on the total weight of the hydroxyl component and the carboxylic component.

32. A process according to claim 31, wherein the polymeric polyol is present at a level of 1 to 20 weight percent, based on the total weight of the hydroxyl component and the carboxylic component.

33. A process according to claim 31, wherein, the polymeric polyol comprises a polyether diol or polyether triol, or a mixture thereof.

34. A process according to claim 31, wherein the polymeric polyol comprises a polyester polyol.

* * * * *